(12) United States Patent
Adam

(10) Patent No.: US 9,222,513 B2
(45) Date of Patent: Dec. 29, 2015

(54) LAMINATE COMPOSITE

(75) Inventor: Achim Adam, Nauheim (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 518 days.

(21) Appl. No.: 13/518,557

(22) PCT Filed: Dec. 16, 2010

(86) PCT No.: PCT/EP2010/069915
§ 371 (c)(1),
(2), (4) Date: Jun. 22, 2012

(87) PCT Pub. No.: WO2011/076662
PCT Pub. Date: Jun. 30, 2011

(65) Prior Publication Data
US 2012/0258293 A1    Oct. 11, 2012

(30) Foreign Application Priority Data
Dec. 23, 2009   (DE) .................. 10 2009 055 239

(51) Int. Cl.
| F16C 33/20 | (2006.01) |
| B32B 5/18 | (2006.01) |
| B32B 15/04 | (2006.01) |
| B32B 15/14 | (2006.01) |
| B32B 15/16 | (2006.01) |
| B32B 15/20 | (2006.01) |
| B32B 27/30 | (2006.01) |

(52) U.S. Cl.
CPC ............... *F16C 33/206* (2013.01); *B32B 5/18* (2013.01); *B32B 15/043* (2013.01); *B32B 15/046* (2013.01); *B32B 15/14* (2013.01); *B32B 15/16* (2013.01); *B32B 15/20* (2013.01); *B32B 27/304* (2013.01); *B32B 2262/0269* (2013.01); *B32B 2262/101* (2013.01); *B32B 2262/106* (2013.01); *B32B 2264/02* (2013.01); *B32B 2264/10* (2013.01); *B32B 2307/554* (2013.01); *B32B 2307/746* (2013.01); *Y10T 428/24851* (2015.01)

(58) Field of Classification Search
None
See application file for complete search history.

(56) References Cited

FOREIGN PATENT DOCUMENTS

| DE | 3343697 A1 | 6/1984 |
| DE | 19507045 A1 | 9/1996 |
| DE | 19808541 C1 | 2/1999 |
| GB | 2139236 A | 11/1984 |
| JP | 2000192961 | 7/2000 |
| WO | WO 99/05425 | 2/1999 |

OTHER PUBLICATIONS

Machine Tranlastion of JP 2000-192961 (cited on Applicants IDS submitted Jun. 22, 2012) via AIPN website.*

* cited by examiner

*Primary Examiner* — Mark Ruthkosky
*Assistant Examiner* — Laura C Powers
(74) *Attorney, Agent, or Firm* — Robert L. Stearns; Dickinson Wright, PLLC

(57) ABSTRACT

The invention relates to a laminate composite comprising a main body, a porous layer disposed on the main body, and a further material that is or comprises a plastic and that is adhesively bonded to the porous layer, further comprising a fluorothermoplast disposed at a boundary between the porous layer and the further material for bonding the further material to the porous layer. The invention further relates to a method for producing said laminate composite and to a use of a fluorothermoplast for bonding a further material to a porous layer of a laminate composite.

16 Claims, 1 Drawing Sheet

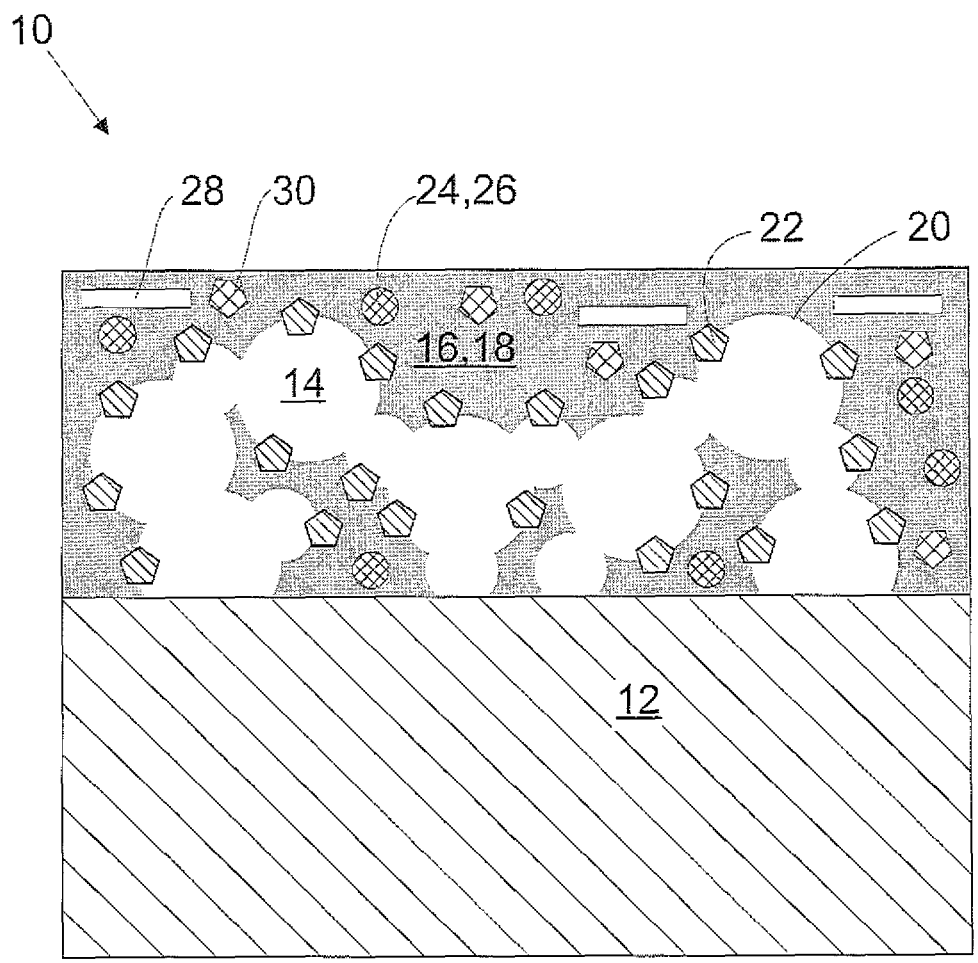

LAMINATE COMPOSITE

BACKGROUND OF THE INVENTION

1. Technical Field

The present invention relates to a laminate composite comprising a main body, a porous layer disposed on the main body and a further material which is or comprises a plastic and is adhesively bonded to the porous layer. Furthermore, the present invention relates to a use of fluorothermoplasts for binding the further material to the porous layer along with a process for producing a laminate composite.

2. Related Art

In particular, these laminate composites are used as bearing materials for plain bearings. The laminate composites generally have a main body onto which a porous layer (usually metallic) is applied. This is then impregnated with and enclosed by a further material. This further material is typically a plastic. There are two main types of plastics that can be used here: PTFE-based plastics and materials which can be processed using thermoplastics.

Depending on the use, the laminate composites can be used in plain bearings for non-lubricated, initially lubricated or media-lubricated applications. Initially lubricated plain bearings are lubricated once during installation, for example using grease. The materials used behave differently in these methods of application. In addition to the compatibility of the corresponding laminate composite with the lubricant, other important material properties for media-lubricated use are its resistance to erosion, delamination and wear.

Flow conditions can arise in the cracked bearing. These corrode the laminate composite or can lead to penetration of the lubricant in the laminate composite, resulting in the layers being separated from one another. The friction which occurs in connection with the lubricant is also important. This is because, for example, friction affects response behaviour when used for guide bushings in shock absorbers or it will affect efficiency when used in pumps.

The properties of the further material used in the media-lubricated bearings can be characterised as follows: Using thermoplastic matrix plastics leads to increased strength and an associated improvement in the anchoring in the porous layer, therefore almost no mechanical damage related to the flow conditions is caused. However, the friction from thermoplastic matrix plastics in connection with media is clearly higher than in PTFE-based materials. The latter are typically distinguished by a particularly low friction coefficient for media lubrication, whilst their flow resistance is limited due to the weak PTFE matrix. Furthermore, unlike thermoplastics, the anchoring of the further PTFE-based material in the porous layer is not supported by any adhesive forces.

Laminate composites which comprise a further PTFE-based material have been used in media-lubricated applications with higher flow loads for several years now. The PTFE base of the further material is modified using $MoS_2$ as a solid lubricant. This type of laminate composite is used, for example, in shock absorbers. Here, it is necessary to achieve response behaviour which has the lowest amount of friction possible due to the requirements for ride comfort.

This type of laminate composite, however, has limited resistance when used in non-lubricated or dry and media-lubricated applications. Special laminate composites based on PTFE which are optimised for wear have therefore been developed for the media-lubricated applications, such as those outlined in DE 196 14 105 B4. An increased resistance to wear and tear is achieved through the addition of iron oxide; however there is a slight increase in the amount of friction depending on the conditions of use.

DE 198 08 541 C1 describes the improvement to the wear of the lubricant layer achieved by adding powdered polyaramids to PTFE, however this does not result in an improved flow resistance. Fluorothermoplasts PFA, FEP, ETFE, PVDF, PCTFE are often mixed in with the material for this purpose, for example as described in DE 33 43 697 A1. Owing to the chemical structure, these have a positive influence on the resistance of the material as they are more tightly bound to the PTFE in the lubricant layer, they allow additives to bind more effectively and they improve the adhesion of the substrate since the fluorothermoplasts reduce the anti-adhesive property of the PTFE. However, the more these properties are sought, the more fluorothermoplast must be added; the consequence of which is indeed an increased friction coefficient.

WO99/05425 describes the production of a laminate composite with a PTFE-based lubricant layer, wherein a PTFE-based film is affixed onto a metal substrate using a fluorothermoplast film. This structure is not however suitable for porous substrates and the associated production method using a PTFE paste. The PTFE mix cannot be impregnated into the pores of the porous layer in the form of an aqueous paste, for example as described in DE 195 07 045 C2, because an intermediate film prevents impregnation by rolling in and the film cannot be repositioned in the rolling process.

SUMMARY OF THE INVENTION

The object of the invention is therefore to improve the adhesion of a further material onto a porous layer without negatively influencing the desired surface properties of the further material.

This is achieved by a fluorothermoplast which is disposed at the boundary between the porous layer and the further material for the purpose of binding the further material to the porous layer. The fluorothermoplast has an adhesive effect, enabling the further material to adhere to the porous layer more effectively. The surface properties of the further material are not influenced by the fluorothermoplast because the fluorothermoplast is disposed almost solely at the boundary between the porous layer and the further material, and not on the surface of the further material. In particular, there is no increase in the friction of the further material surface. As a result, it is possible to choose the further material for the present invention freely according to the required surface properties, without having to take the effects of the fluorothermoplast on the surface properties of the further material into consideration.

In a preferred embodiment of the laminate composite according to the present invention, the fluorothermoplast is either PFA, FEP, ETFE, PVDF, PCTFE or a mixture of these. These fluorothermoplasts are available at a reasonable price and have been proved to be particularly advantageous for affixing the further material to the porous layer with improved adhesion. Furthermore, the choice of fluorothermoplasts that can be used (and the provided list is not exhaustive) provides flexibility, enabling the optimisation of adhesion according to the properties of the porous layer and further material used. Preferably, the fluorothermoplasts used can be melted in order to activate their adhesive effect on the porous layer and the further material by means of heat treatment.

In a preferred embodiment of the invention in which the porous layer has a pore volume, the volume of the fluorothermoplast occupies between 5% and 50% and between 5% and 25% of the pore volume in particular.

The adhesion between the further material and the porous layer has been found to be optimised in this range. In particular, maximum adhesion occurs with a fluorothermoplast volume of between 5% and 25% of the pore volume of the porous layer. Furthermore, this ensures that the pores of the porous layer are not sealed. If the proportion of the sealed pores exceeds a certain amount, there will be a negative impact on the mechanical properties of the laminate composite.

Preferably, the fluorothermoplast is available as a powder. The fluorothermoplast can easily be applied to a porous layer in production. The size of the particles in the fluorothermoplast are shown be equal to 100 pm or smaller. This ensures that the particles are able to penetrate the pores of the porous layer without sealing them. Sealed pores have a negative effect on the mechanical properties of the laminate composite.

The further material is designed as a sliding layer in a preferred embodiment of the present invention. In this embodiment, the laminate composite is particularly suitable for use in plain bearings, although the idea according to the invention is not limited to plain bearings.

The lubricant layer preferably comprises or is constituted of a PTFE-based material. Such materials are distinguished by low friction coefficients, meaning that the bearing of axles for example is particularly effective, and in that friction loss can be reduced.

Preferably, the lubricant layer contains added thermoset or thermoplastic materials. The workability of the lubricant layer can be improved by these additions and their mechanical properties can be specifically altered, particularly in connection with PTFE materials.

In a preferred embodiment of the present invention, the thermosetting plastics or thermoplastics will either be PFA, FEP, ETFE, PVDF, PCTFE, PEEK, PPS, PA, PPA, LCP, PES, PSU, PEI, PPTA, PBA, PI, PAI or $PPSO_2$ or a mixture of these. These plastics have proved to be particularly beneficial for the use of laminate composites in plain bearings. PFA, FEP, ETFE, PVDF and PCTFE particularly improve the wear resistance of the lubricant layer.

Preferably, the lubricant layer contains further solid lubricants, hard particles and/or fibres. The surface properties of the PTFE-based lubricant layer can be specifically changed by these additions and adapted to the respective application.

The preferred solid lubricants are $MoS_2$, $WS_2$, h-BN, Pb, Sn, PbO, Zn, ZnS, $BaSO_4$, SnS2, graphite, $CaF_2$ or phyllosilicates. For example, an advantage of using M0S2 as a lubricant is that it does not negatively affect the low friction coefficient of the PTFE, however at the same time it reduces the wear of the soft PTFE matrix, thus enabling an increase in the life span of the lubricant layer.

The preferred hard particles are SiC, $Si_3N$, BC, c-BN, or metal oxides. Hard particles reduce the wear on the lubricant layer when using the laminate composite whilst simultaneously achieving a polishing effect on the component which is supported by the laminate composite, such as an axle.

In a preferred embodiment if the invention, the fibres are made of glass, coal or aramid. The advantage of this embodiment lies in its high resistance to heat. Also, the wealth of experience of handling glass, coal or amarid fibres and the use of these is advantageous from a technical perspective in that they can be controlled.

It is advantageous for the porous layer to contain aluminium and/or copper and/or alloys of these. The advantage of using aluminium and/or copper and/or alloys of these relates to the wealth of experience of working with these materials available, showing them to be particularly well suited to the purpose according to the invention.

The porous layer can consist of sintered powder, metal foam, expanded metal, fleece or a woven material. The advantage of using sintered powder, metal foam, expanded metal, fleece or a woven material is that a large surface and open structure can be created, thus increasing the boundary between the porous layer and the lubricant layer. This method also improves the adhesion between the lubricant layer and the porous layer.

Preferably, the main body comprises steel, aluminium and/or copper and/or alloys of these. The materials have also been shown to be particularly suited for use in plain bearings in this case, therefore there is a wealth of experience available in terms of plain bearings constructed from these materials; the ability to refer to this experience is also an advantage.

A further aspect of the present invention relates to a use of fluorothermoplasts for binding a further material to a porous layer of a laminate composite according to one of the previous embodiments of the invention, wherein the fluorothermoplast is disposed at the boundary between the porous layer and the further material.

A further aspect of the present invention relates to a method for producing a laminate composite according to one of the aforementioned embodiments of the invention.
Application of a fluorothermoplast to a porous layer,
Securing the fluorothermoplast to the porous layer by means of heat treatment,
Impregnating the porous layer with a further material, and
Adhesion of the porous layer to the further material.

The method for the present invention is preferably executed in the order indicated above, although the concept of the present invention is not limited to this particular order.

The porous layer is usually disposed on the main body, which has a ribbon-like formation. The stage in which the fluorothermoplast is fixed to the porous layer can be realised by means of heat treatment, whereby the ribbon-like main body is led through a continuous furnace or additional heat and/or cooling stages are provided for. The porous layer can be impregnated with the further material e.g. by rolling this in. The further adhesion of the porous layer to the further material is usually realised in a sintering process, which will preferably be performed at between 350° C. and 400° C. for 1 to 3 minutes. The laminate composite can subsequently be rolled onto the desired gauge block.

Preferably, the method according to the invention includes the application of the fluorothermoplast to the porous surface, either as powder or as a dispersion. The advantage of powder in comparison to a dispersion is that a powder is easier to manage during processing. In the subsequent sintering process, the liquid must first be removed from the laminate composite when using a dispersion, which could prolong the sintering process and potentially result in blistering. This is not the case when using a powdered fluorothermoplast.

Since the original form of fluorothermoplasts come is a dispersion, the need to produce a corresponding powder is removed, thus reducing the production costs for the laminate composite. The advantage of applying the fluorothermoplast in the form of a dispersion is that the fluorothermoplast can be applied to the porous layer in a manner which increases the surface area used to aid adhesion, thus enhancing the adhesive effect. However, the method also produces satisfactory results when powder is used, enabling any fluorothermoplasts which are available in the form of powder or a dispersion to be processed.

The powdered fluorothermoplast can, for example, be applied to the porous layer using a sieve or a doctor blade. If the fluorothermoplast is available as a dispersion, it can either be applied to the porous layer by spraying through a nozzle, transferring from a roll surface, transferring by means of squeezing through a sponge, or by spreading the dispersion using a rotating disc. The dispersion can also be applied to the porous layer by means of a screen printing process, through contact with a capillary dosing unit such as a brush, felt or webbing.

THE DRAWINGS

The invention is described in detail below, with reference to examples of a preferable embodiment of the invention and the accompanying illustrations.

FIG. 1 shows the basic structure of a laminate composite according to an embodiment of the present invention.

DETAILED DESCRIPTION

By means of a schematic diagram, FIG. 1 shows a laminate composite 10 according to an embodiment of the invention. The laminate composite 10 includes a main body 12 to which a porous layer 14 is applied. A further material 16 is disposed on the porous layer, which is designed as a sliding layer in the embodiment of the invention shown. Typically, the further material 16 designed as a sliding layer comprises a PTFE-based plastic. The porous layer 14 and the further material 16 come into contact on a boundary 20. A fluorothermoplast 22 with an adhesive effect is disposed on this boundary 20 and the porous layer 14 and bonded to the further material 16. The fluorothermoplast is applied in powdered form in the example given. The further material 16 also contains a solid lubricant 24, hard particles 26, fibres 28 and thermoset or thermoplastic particles 30, which are used to adjust the desired characteristics, in particular the characteristics of the sliding layer's surface. The thermoset or thermoplastic particles 30, solid lubricant 24, hard particles 26 and the fibres 28 are introduced into the further material at random. No preferred orders or directions are required.

The porous layer 14 has a pore volume $V_p$, which represents the difference between the overall volume occupied by the porous layer 14 and the volume taken up by the material used to produce this porous layer. The volume taken up by the further material 16 is irrelevant here. The fluorothermoplasts 22 take up a volume $V_F$.

As mentioned above, the fluorothermoplasts in FIG. 1 are applied in powdered form, whereby the particles are discretely disposed on the boundary 20. If the fluorothermoplast 22 is also available in disperser format, it can also be applied to the porous layer 14 as a dispersion. Here, the fluorothermoplast 22 forms a kind of coating on the boundary 20, which can occupy the entire boundary 20.

Friction is determined as follows: A round sample measuring 10 mm in diameter is pressed onto the surface of a rotating roll measuring 100 mm in diameter (surface speed: 0.5 m/s) with a defined load (17.5 MPa). When stamped, the sample adapts to the form of the radius of the roll. The test trail is moistened with hydraulic oil and the frictional force applied by the loaded probe is identified using a torque transmitter in the drive shaft.

The first column indicates the friction values measured for laminate composites for which no fluorothermoplasts are added to the sliding layer. The second and third columns indicate the friction values measured for coating materials in which fluorothermoplasts (PFA in this case) were introduced to the sliding layer as either a dispersion (column 2) or in powdered form (column 3) before bonding this composite material to the porous layer. In the following columns 4 to 8, the fluorothermoplast (PFA, FEP, ETFE a and PFDF here) was applied to the porous layer in the manner according to the invention, then the sliding layer was applied to the porous layer on the boundary of the latter that contained the fluorothermoplast.

As is demonstrated by columns 2 and 3, an increase results when the fluorothermoplast is mixed with the sliding layer then applied to the porous layer. As mentioned at the beginning, is it known that an increase in surface friction results when a higher concentration of fluorothermoplast is used. This effect is demonstrated by comparing the values indicated in columns 2 and 3 with the comparative values in column 1. As the fluorothermoplasts are mixed with the sliding layer and randomly distributed there, a certain proportion of the fluorothermoplasts are disposed on the surface of the sliding layer, leading to an increase in friction there. According to the invention, this effect is either absent or only occurs rarely, as demonstrated when comparing the values entered in columns 4 to 8. This is because the fluorothermoplasts according to the invention are only disposed on the boundary between the porous layer and the sliding layer; not on the surface of the sliding layer.

EMBODIMENTS OF THE INVENTION

TABLE 1

A comparison of the friction coefficients (dimensionless) of laminate composites according to the invention with traditional laminate composites.

| Reibungskoeffizient μ "Stift-Walze" [-], 0.5 m/s, 17.5 MPa Tropföl | Ohne Zusatz | PFA 10% Dispersions-Zusatz | PFA 10% Pulver Zusatz | PFA Dispersions-schicht | PFA Pulver-schicht | FEP Pulver-schicht | ETFE Pulver-schicht | PVDF Pulver-schicht |
|---|---|---|---|---|---|---|---|---|
| 20% $MoS_2$ | 0.021 | | 0.024 | | 0.020 | 0.021 | | 0.020 |
| 20% $CaF_2$ | 0.041 | | 0.045 | | 0.042 | | 0.042 | |
| 20% ZnS | 0.026 | 0.038 | | 0.031 | | 0.029 | | |
| 6% MoS2 6% hBN 3% $Fe_2O_3$ 5% PPTA | 0.029 | 0.037 | | 0.034 | | | 0.029 | 0.028 |
| Friction coefficient μ "sprockets" [-], 17.5 MPa dripping oil | No additives | 10% PFA dispersive additive | 10% PFA powder additive | PFA dispersion layer | PFA powder layer | FEP powder layer | EFTE powder layer | PVDF powder layer |

TABLE 2

A comparison of the adhesive strength of laminate composites according to the invention with traditional laminate composites, measured in MPa.

| Haftfestigkeit Zugversuch [Mpa] | ohne | PFA Dispersionszusatz | PFA Pulverzusatz | PFA Dispersionsschicht | PFA Pulverschicht | FEP Pulver | ETFE Pulver | PVDF Pulver |
|---|---|---|---|---|---|---|---|---|
| 20% MoS2 | 4.6 | | 4.7 | | 5.8 | 5.7 | | 5.5 |
| 20% CaF2 | 4.3 | | 4.5 | | 5.8 | | 5.4 | |
| 20% ZnS | 4.4 | 4.3 | | 5.5 | | 5.2 | | |
| 6% MoS2 6% hBN 3% Fe2O3 5% PPTA | 4.5 | 4.5 | | 5.8 | | | 5.8 | 5.3 |
| Adhesive strength test [Mpa] | No additives | PFA dispersive additive | PFA powder additive | PFA dispersive additive | PFA powder layer | FEP powder layer | EFTE powder | PVDF powder |

Adhesive strength is determined as follows: Etching the sample with sodium naphthalene, adhesively bonding with a roughened indenter in a perpendicular direction to the adhesive surface using a Zwick universal testing maching Z050, 0.2 mm/s. The order of the columns corresponds to the order in Table 1.

A comparison of the values measured for adhesive strength indicated in column 1 with the values in columns 2 and 3 clearly demonstrates that mixing the fluorothermoplasts with the sliding layer does not lead any notable increase in adhesive strength. The random distribution of the fluorothermoplasts to the sliding layer means that only some of the fluorothermoplasts are disposed on the boundary between the porous and the sliding layers, therefore only this proportion can contribute to an increase in adhesive strength. In contrast, the solution brought about by the invention leads to a significant increase in adhesive strength, as demonstrated by the values in columns 4 to 8. Almost all of the fluorothermoplasts are disposed on the boundary according to the invention, thus significantly increasing adhesive strength.

TABLE 3

A comparison of the life spans of laminate composites according to the invention with those of traditional laminate composites, measured in hours.

| Lebensdauer Stoßdämpfer Test "Kavitation"[h] | Ohne | PFA Dispersionszusatz | PFA Pulverzusatz | PFA Dispersionsschicht | PFA Pulverschicht | FEP Pulver | ETFE Pulver | PVDF Pulver |
|---|---|---|---|---|---|---|---|---|
| 20% MoS2 | 37 | | 40 | | 72 | 61 | | 49 |
| 20% CaF2 | 39 | | 38 | | 68 | | 55 | |
| 20% ZnS | 22 | 25 | | 36 | | 51 | | |
| 6% MoS2 6% hBN 3% Fe2O3 5% PPTA | 92 | 96 | | >120 (Abbruch) | | | >120 (Abbruch) | 113 |
| Life span "cavitation" shock absorber test | No additives | PFA dispersive additive | PFA powder additive | PFA dispersion layer | PFA powder layer | FEP powder | EFTE powder | PVDF powder |

Life span is determined as follows: ("cavitation" shock absorber test) Bushing with a surface width of 10 mm was tested in twin-tube dampers with a rod diameter of 22 mm at a constant lateral load of 2000 N. In doing so, step movements and sinusoidal movements are executed alternatively for 20 seconds, each at 0.5 Hz and a double amplitude of 80 mm, until the corrosion of the sliding surface leads to leakage. The test is aborted after a maximum of 120 hours. The order of the columns corresponds to the order indicated in tables 1 and 2.

A comparison of the life span values measured in column 1 with the values in columns 2 and 3 clearly shows that the addition of fluorothermoplasts to the sliding layer does not result in a notable increase to the life span of the laminate composite. In contrast, the solution brought about by the invention results in a significantly increased life span, as demonstrated by the values entered in columns 4 to 8.

The invention is described with reference to the preferred embodiments of the invention. Any resulting slight modifications and extensions of the described method by specialists do not deviate from the concept upon which the present invention is based and are included in the scope of protection, as defined by the following claims for protection.

The invention claimed is:
1. A laminate composite comprising:
   a main body,
   a porous layer including a base material and a plurality of pores disposed on the main body, the porous layer having a pore volume ($V_p$), wherein the pore volume ($V_p$) is the difference between the overall volume occupied by the base material and the pores of the porous layer and the volume of the base material,
   a further material comprised of plastic and disposed at least in the pores of the porous layer, wherein a first portion of the further material contacts the base material of the porous layer,
   a fluorothermoplast disposed discontinuously on a boundary between the base material of the porous layer and a second portion of the further material for bonding the further material to the base material of the porous layer, and
   wherein the fluorothermoplast in the laminate composite has a volume ($V_f$) of between 5% and 50% of the pore volume ($V_p$).

2. A laminate composite according to claim 1, wherein the fluorothermoplast is selected from the group consisting of PFA, PEP, ETFE, PVDF, PCTFE or a mixture of two or more of these.

3. A laminate composite according to claim 1, wherein the fluorothermoplast is provided as a powder.

4. A laminate composite according to claim 3, wherein the size of the particles in the fluorothermoplast is 100 pm or smaller.

5. A laminate composite according to claim 1, wherein the further material comprises a sliding layer.

6. A laminate composite according to claim 5, wherein the sliding layer comprises a PTFE-based material.

7. A laminate composite according to claim 6, wherein the sliding layer comprises added thermoset or thermoplastic material in the form of thermoset or thermoplastic particles.

8. A laminate composite according to claim 7 wherein the thermoplastic or thermoset material is selected from the group consisting of either PFA, FEP, ETFE, PVDF, PCTFE, PEEK, PPS, PA, PPA, LCP, PES, PSU, PEI, PPTA, PBA, PI, PAI or $PPSO_2$ or a mixture of two or more of these.

9. A laminate composite according to claim 5, wherein the sliding layer comprises a solid lubricant, hard particles and/or fibres.

10. A laminate composite according to claim 9, wherein the solid lubricant are present and selected from the group consisting of $MoS_2$, WS2, h-BN, Pb, Sn, PbO, Zn, ZnS, $BaSO_4$, $SnS_2$, graphite, $CaF_2$ or phyllosilicates.

11. A laminate composite according to claim 9, wherein the hard particles are present and selected from the group consisting of SiC, $Si_3N_4$, BC, c-BN, or metal oxides.

12. A laminate composite according to claim 9 wherein the fibres are present and selected from the group consisting of glass, carbon, or aramid.

13. A laminate composite according to claim 1, wherein the porous layer is selected from the group consisting of aluminum, copper, or alloys thereof.

14. A laminate composite according to claim 1, wherein the porous layer is selected from the group consisting of a sintered powder, metal foam, expanded metal, fleece or a woven material.

15. A laminate composite according to claim 1, wherein the main body is selected from the group consisting of steel, aluminum, copper or alloys of these materials.

16. A laminate composite according to claim 1, wherein the fluorothermoplast in the laminate composite has a volume ($V_f$) of between 5% and 25% of the pore volume ($V_p$).

* * * * *

UNITED STATES PATENT AND TRADEMARK OFFICE
CERTIFICATE OF CORRECTION

PATENT NO. : 9,222,513 B2
APPLICATION NO. : 13/518557
DATED : December 29, 2015
INVENTOR(S) : Achim Adam Page 1 of 1

It is certified that error appears in the above-identified patent and that said Letters Patent is hereby corrected as shown below:

IN THE SPECIFICATION

Column 5-6, Lines 51-55 Please replace the Top Row of Table 1 with the following:

| Friction coefficient µ "sprockets" [-], 17.5 MPa dripping oil | No additives | 10% PFA dispersive additive | 10% PFA powder additive | PFA dispersion layer | PFA powder layer | FEP powder layer | EFTE powder layer | PVDF powder layer |
|---|---|---|---|---|---|---|---|---|

Column 7-8, Lines 4-6 Please replace the Top Row of Table 2 with the following:

| Adhesive strength test [Mpa] | No additives | PFA dispersive additive | PFA powder additive | PFA dispersive additive | PFA powder layer | FEP powder layer | EFTE powder | PVDF powder |
|---|---|---|---|---|---|---|---|---|

Column 7-8, Lines 41-44 Please replace the Top Row of Table 3 with the following:

| Life span "cavitation" shock absorber test | No additives | PFA dispersive additive | PFA powder additive | PFA dispersion layer | PFA powder layer | FEP powder | EFTE powder | PVDF powder |
|---|---|---|---|---|---|---|---|---|

Signed and Sealed this
Eighth Day of March, 2016

Michelle K. Lee
*Director of the United States Patent and Trademark Office*